United States Patent
Gross et al.

(10) Patent No.: US 7,761,244 B2
(45) Date of Patent: Jul. 20, 2010

(54) SELECTIVELY MITIGATING MULTIPLE VIBRATION SOURCES IN A COMPUTER SYSTEM

(75) Inventors: Kenny C. Gross, San Diego, CA (US); Aleksey M. Urmanov, San Diego, CA (US); Kalyanaraman Vaidyanathan, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 338 days.

(21) Appl. No.: 11/852,059

(22) Filed: Sep. 7, 2007

(65) Prior Publication Data
US 2009/0067080 A1    Mar. 12, 2009

(51) Int. Cl.
G06F 19/00 (2006.01)
G11B 5/00 (2006.01)

(52) U.S. Cl. ............... 702/34; 702/56; 360/25; 360/71

(58) Field of Classification Search ............ 702/34, 702/56, 75; 360/25, 71, 97.02
See application file for complete search history.

(56) References Cited

U.S. PATENT DOCUMENTS 7,661,316 B2 *   2/2010   Gross et al. ............ 73/660

2002/0038188 A1 *   3/2002   Fioravanti ............ 702/75

* cited by examiner

Primary Examiner—Bryan Bui
(74) Attorney, Agent, or Firm—Park, Vaughan & Fleming LLP (57) ABSTRACT

One embodiment of the present invention provides a system that mitigates the effects of multiple vibration sources on a set of hard disk drives (HDDs) within a computer system. During operation, the system identifies a target HDD in the set of HDDs, wherein the performance of the target HDD is affected by mechanical vibrations. The system also identifies one or more primary vibration sources from the multiple vibration sources that affect the performance of the target HDD. Next, for each of the primary vibration sources, the system measures a first time-domain signal associated with the operation of the primary vibration source using a first vibration transducer associated with the primary vibration source. The system also measures a second time-domain signal associated with the target HDD using a second vibration transducer associated with the target HDD. Next, for each of the primary vibration sources, the system then computes a cross-power-spectral-density (CPSD) between the first and the second time-domain signals. The system then selectively mitigates the primary vibration sources based on the CPSDs between the primary vibration sources and the target HDD.

23 Claims, 7 Drawing Sheets

SELECTIVELY MITIGATING MULTIPLE VIBRATION SOURCES IN A COMPUTER SYSTEM

BACKGROUND

1. Field of the Invention

Embodiments of the present invention relate to techniques for improving the reliability of computer systems. More specifically, embodiments of the present invention relate to a method and an apparatus that improves the reliability of a computer system by selectively mitigating multiple vibration sources within the computer system.

2. Related Art

Computer systems such as servers and storage arrays can be adversely affected by mechanical vibrations of system internal components and structures. These vibrational problems are becoming more significant because of the following trends: (1) cooling fans are becoming increasingly more powerful; (2) chassis and support structures are becoming weaker because of design modifications that reduce cost and weight; and (3) internal disk drives, power supplies, and other system components are becoming more sensitive to vibration-induced degradation. For example, hard disk drives (HDDs) are becoming more sensitive to vibration because the storage density for HDDs has increased to the point where a write head has to align with a track which is less than 20 nanometers wide. Moreover, the write head floats only 7 nanometers above the disk surface. These extremely small dimensions make the read and write performance of the HDDs very sensitive to vibrations. Even low levels of sustained vibrations can significantly deteriorate I/O performance of the HDDs.

Cooling fans are a significant source of mechanical vibrations in a computer system. More specifically, servers and storage arrays are typically equipped with a large number of cooling fans (e.g., twelve or more) that operate at very high speeds. Because fan speeds in most computer systems are not actively controlled, the speed of each fan typically varies from the designed speed. One problem associated with fan speed variation is that it can excite vibrational resonances within a computer system's mechanical structure. Specifically, if a fan's operating speed or an associated harmonic coincides with an internal vibrational resonance of the computer system, there can be a significant resonance-related amplification of the vibration which can cause HDDs to fail or perform poorly. Note that an even more direct cause of an HDD failure is when the frequency of a fan-induced mechanical vibration coincides with the internal vibrational resonance of the HDD, which is typically associated with the rotation speed of the HDD during operation. Hence, it is highly desirable to mitigate cool-fan-induced mechanical vibrations in order to improve the health of HDDs.

A "brute force" approach to mitigating vibration-induced HDD failures involves: (1) identifying HDDs which are adversely affected by the vibrations; (2) identifying components that are generating the vibrations (e.g., cooling fans or other HDDs); and (3) taking action to mitigate vibrations for the components identified in steps (1) and (2).

Unfortunately, the above-described approach can be extremely costly and inefficient in practice. Note that the mitigation action often involves inserting rubber or foam dampers, grommets, or stiffeners in available spaces around identified vibration sources and vibration-sensitive HDDs in an effort to isolate these components from the rest of the computer system. For a simple computer system that comprises only a few vibration-sensitive HDDs and only a few significant vibration sources, this is a relatively easy task. For example, for a single-cool-fan in a single-HDD system, one can place isolation materials around the fan and/or the HDD until the desired level of HDD performance is achieved. However, for more complex computer systems containing multiple HDDs and multiple fans (e.g., servers and storage arrays) the mitigation process can become substantially more complex. For example, in a large server that contains 14 internal fans and 48 internal HDDs, it becomes extremely difficult to determine which vibration sources (i.e., fans and HDDs) cause problems for specific HDDs. In the example server system described above, one would have to experimentally assess a total of 2,928 unique pair-wise combinations of target components, i.e., 48 HDDs paired with vibrating components (14 fans plus 47 other HDDs).

One option is to mitigate all the fans in the server in an attempt to isolate each component that vibrates (which includes all fans and all HDDs) from each component that is vibration sensitive (i.e., the HDDs). However, this option entails an enormous amount of work and can result in significant additional cost and complexity.

Hence, what is needed is a method and an apparatus that facilitates mitigating multiple vibration problems without the above-described issues.

SUMMARY

One embodiment of the present invention provides a system that mitigates the effects of multiple vibration sources on a set of hard disk drives (HDDs) within a computer system. During operation, the system identifies a target HDD in the set of HDDs, wherein the performance of the target HDD is affected by mechanical vibrations. The system also identifies one or more primary vibration sources from the multiple vibration sources that affect the performance of the target HDD. Next, for each of the primary vibration sources, the system measures a first time-domain signal associated with the operation of the primary vibration source using a first vibration transducer associated with the primary vibration source. The system also measures a second time-domain signal associated with the target HDD using a second vibration transducer associated with the target HDD. Next, for each of the primary vibration sources, the system computes a cross-power-spectral-density (CPSD) between the first and the second time-domain signals. The system then selectively mitigates the primary vibration sources based on the CPSDs between the primary vibration sources and the target HDD.

In a variation on this embodiment, the system identifies the target HDD in the set of HDDs by: performing I/O throughput measurements on the set of HDDs; ranking the I/O throughput performance of the set of HDDs; determining if the lowest I/O throughput is below a threshold; and if so, identifying an HDD associated with the lowest I/O throughput as the target HDD.

In a variation on this embodiment, the system classifies the multiple vibration sources into a set of fans and a set of HDDs.

In a further variation, the system identifies one or more primary vibration sources in the set of fans by doing the following: for each fan in the set of fans, sweeping through an operational range of rotation speeds while monitoring the performance of the target HDD. During this process, the system determines that the associated fan is a primary vibration source if the performance of the target HDD varies with the fan's rotation speed.

In a further variation on this embodiment, the system identifies one or more primary vibration sources from the set of HDDs by performing a rotational vibration (RV) test on an HDD which is adjacent to the target HDD. During this process, the system monitors the performance of the target HDD and determines that the associated HDD is a primary vibration source if the performance of the target HDD varies with the RV test.

In a variation on this embodiment, the first and the second time-domain signals are measured during the same time period.

In a variation on this embodiment, the system performs a spectral analysis on the first and the second time-domain signals to obtain the corresponding frequency domain spectra prior to computing the CPSD between the first and the second time-domain signals.

In a further variation on this embodiment, the system computes the CPSD between the first and the second time-domain signals by computing a cross-correlation between the corresponding frequency domain spectra.

In a variation on this embodiment, both the first and second vibration transducers are accelerometers.

In a variation on this embodiment, the system selectively mitigates the primary vibration sources based on the CPSDs by: ranking the CPSDs according to the amplitudes of associated correlation peaks; identifying a main vibration source which has the largest amplitude; and mitigating the main vibration source to reduce the mechanical coupling between the main vibration source and the target HDD.

In a further variation on this embodiment, the system mitigates the main vibration source by applying damping and/or stiffening materials around the main vibration source.

In a further variation, the system determines if the performance of the target HDD has improved above a threshold. If not, the system identifies a second main vibration source which has the second largest amplitude. The system then mitigates the second main vibration source to reduce a mechanical coupling between the second main vibration source and the target HDD.

In a variation on this embodiment, the system performs the spectral analysis by using a Fast Fourier Transform (FFT).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Hard disk drives (HDDs) in computer systems have become increasingly more sensitive to mechanical vibrations. Specifically, read/write I/O performance of the HDDs can deteriorate significantly if the HDDs experience even low levels of sustained vibrations. In particular, for computer systems that include a large number of HDDs and a large number of vibration sources, mitigating all the vibration sources typically becomes too costly and is consequently not practical.

Embodiments of the present invention use cross-power-spectral density (CPSD) analyses to obtain mechanical coupling coefficients between pairs of vibrating components (i.e., sources) and vibration-sensitive components (i.e., targets). These mechanical coupling coefficients provide precise, quantitative metrics for assessing the strength of mechanical coupling between a given source component and a given target component. Furthermore, instead of computing a CPSD for each possible pair of source and target components, embodiments of the present invention provide techniques for identifying primary target HDDs and primary vibration sources associated with the primary targets. By computing CPSDs only between primary target-source pairs, the present invention substantially reduces the number of target-source pairs that need to be assessed.

Computer System with a Multiple Fans and Multiple HDDs

Figure 1:
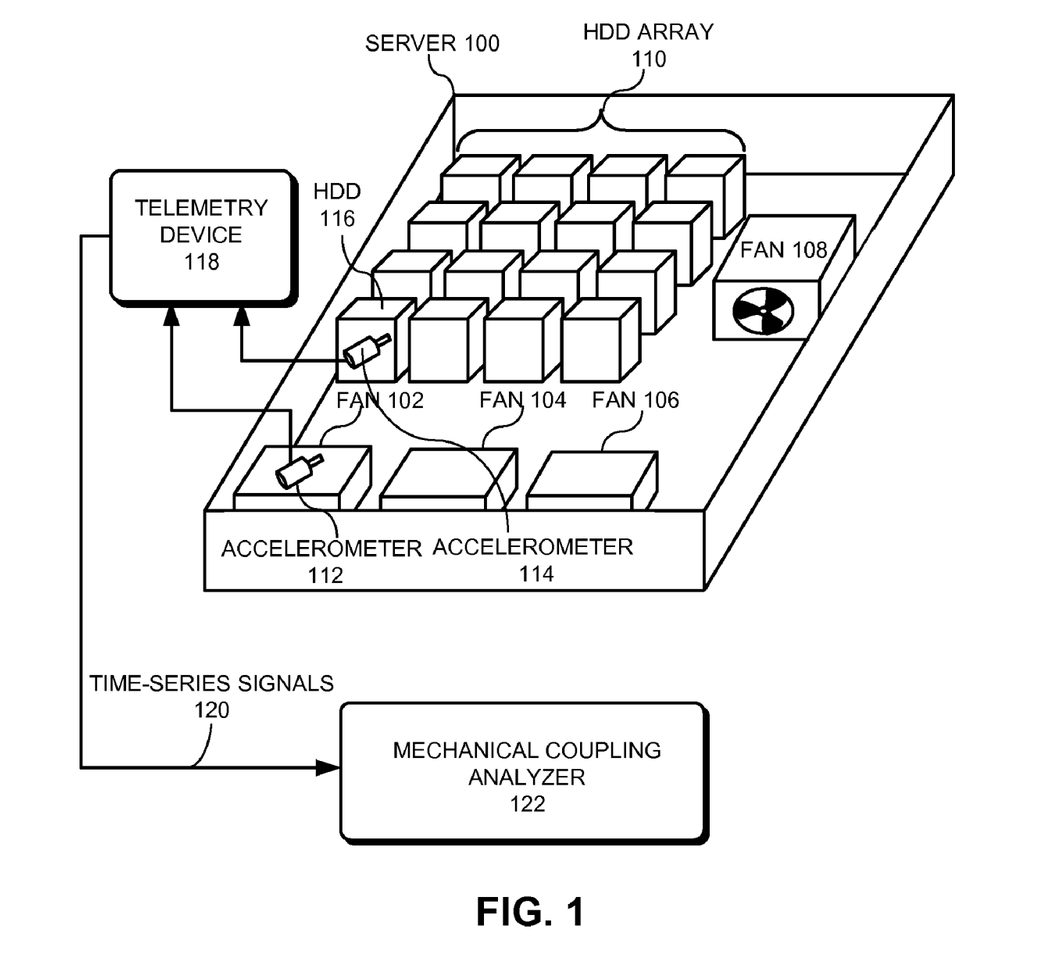
FIG. 1 illustrates a server that includes multiple fans and multiple HDDs in accordance with an embodiment of the present invention.

FIG. 1 illustrates a server 100 that includes multiple fans and multiple HDDs in accordance with an embodiment of the present invention. More specifically, server 100 includes a number of cooling fans, i.e., fan 102, fan 104, fan 106, and fan 108. These cooling fans are deployed to increase air circulation around heat-generating components in server 100 and to pump heat out of server 100. Such heat-generating components can include: the CPU, memory modules, the power supply, and hard disk drives (HDDs). Hence, fans 102-108 may be placed at different locations inside server 100. Note that although server 100 is used for the purposes of illustration, embodiments of the present invention can be applied to other computer systems, such as desktop computers, workstations, storage arrays, embedded computer systems, automated manufacturing systems, and other computer systems which use one or more cooling fans for system cooling.

Server 100 also includes an HDD array 110, wherein one or more of the HDDs in HDD array 110 are sensitive to mechanical vibrations within server 100. Note that although we show one HDD array in FIG. 1, some computer systems can include more than one HDD array, while other computer systems can include multiple HDDs which are not necessarily configured as an array. Note that mechanical coupling can exist between each of fans 102-108 and a given HDD in HDD array 110. Furthermore, mechanical coupling can exist between a pair of HDDs in HDD array 110.

As cooling fans become increasingly more powerful, they can create a significant amount of mechanical vibrations in the computer system. In the following discussion, we use terms "vibration" and "mechanical vibration" interchangeably. We also use the term "fan speed" to refer to the rotation frequency of a fan. Note that because fan blades rotate at a constant rotational speed in terms of rotations per minute (RPM), this RPM value gives rise to a corresponding frequency component in an associated vibration spectrum (in Hz). For example, a fan speed of 6000 RPM creates a mechanical vibration containing a frequency component of (6000 RPM)/(60 sec)=100 Hz. Note that other frequency components can exist in the vibrational spectrum which are also associated with the fan operation. These frequency components can include, but are not limited to, harmonics (e.g., 1×, 2×, 3×, 4×, etc.) of the primary frequency, and beat frequencies created by slightly different speeds between fans in the set of fans.

Referring back to FIG. 1, server 100 includes an accelerometer 112 placed on or integrated with fan 102. Accelerometer 112 can be used to detect mechanical vibrations produced by fan 102. Specifically, accelerometer 112 is configured to pick up vibration signals associated with fan 102, which contain information on the fan speed (in RPM). The accelerometer can then produce an electric signal that replicates the vibration signals from the fan. Server 100 also includes another accelerometer 114 placed on or integrated with HDD 116. Accelerometer 114 can be used to detect mechanical vibrations associated with HDD 116. Specifically, accelerometer 114 is configured to pick up vibration signals associated with HDD 116, which contain information about the spindle rotation speed (in RPM) of HDD 116. The accelerometer can then produce an electric signal that replicates the vibration signals associated with the HDD.

The outputs from accelerometers 112 and 114 are coupled to a telemetry device 118, which is capable of gathering electrical signals produced by the accelerometers and generating time-series signals 120. In one embodiment of the present invention, telemetry device 118 is a Continuous System Telemetry Harness (CSTH). Telemetry device 118 directs time-series signal 120 to a local or a remote location that contains a mechanical coupling analyzer 122. Mechanical coupling analyzer 122 is configured to perform cross-power-spectral-density (CPSD) analyses to obtain mechanical coupling coefficients between fan 102 and HDD 116. We describe the operation of the mechanical coupling analyzer 122 in more detail below.

Note that although we show a pair of accelerometers being placed on a particular fan-HDD pair, accelerometers can generally be placed on any fan-HDD pair or HDD-HDD pair in server 100 to provide mechanical coupling information between a pair of system components. Also note that the present invention is applicable to a computer system equipped with any number of fans and any number of HDDs. Hence, the present invention is not limited to the particular configuration illustrated in FIG. 1.

Selectively Mitigating Vibration Sources for Multiple HDDs Using CPSD

Figure 2:
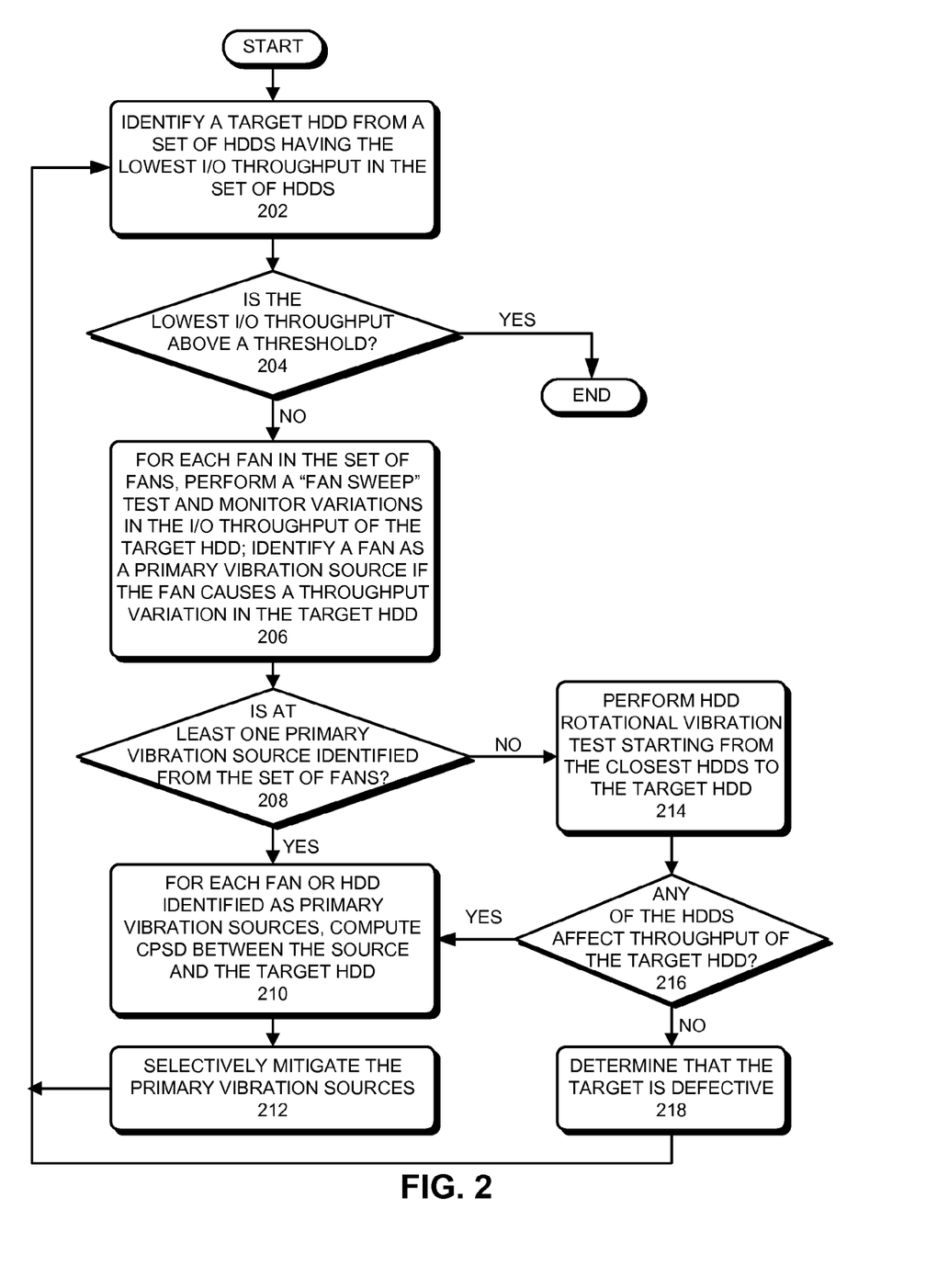
FIG. 2 presents a flowchart illustrating the process of selectively mitigating vibration sources in a computer system in accordance with an embodiment of the present invention.

FIG. 2 presents a flowchart illustrating the process of selectively mitigating vibration sources in a computer system in accordance with an embodiment of the present invention. Note that the computer system comprises one or more HDDs and one or more fans as illustrated in FIG. 1.

During operation, the system identifies a target HDD from a set of HDDs based on inferential performance metrics associated with HDD operation (step 202). Note that these inferential performance metrics provide an indicator of the level of vibration-induced degradation on the HDD performance. In one embodiment of the present invention, these inferential performance metrics include the I/O throughput of the HDD.

Figure 3:
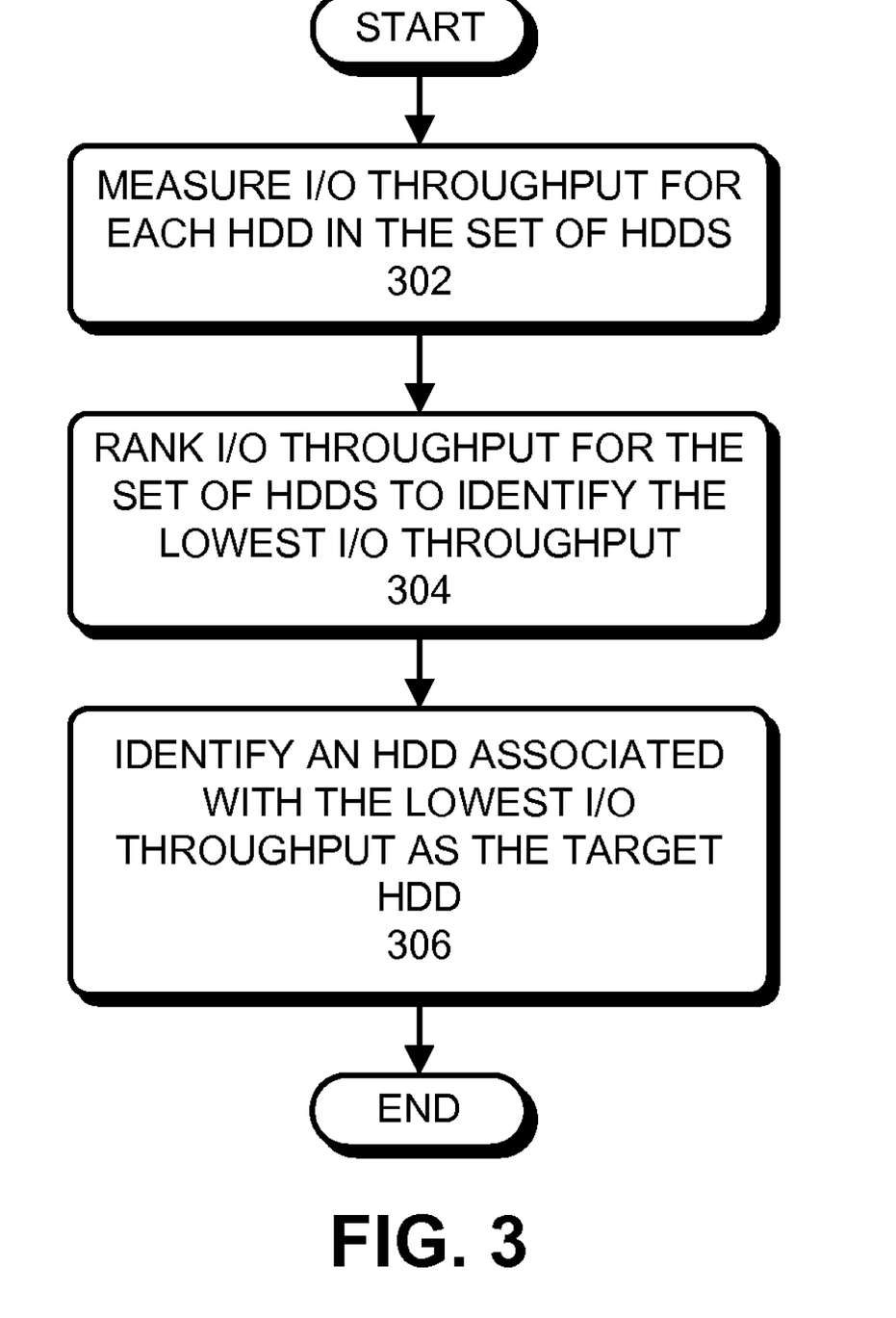
FIG. 3 presents a flowchart illustrating the process of identifying a target HDD from a set of HDDs in a computer system in accordance with an embodiment of the present invention.

FIG. 3 presents a flowchart illustrating the process of identifying a target HDD from a set of HDDs in a computer system in accordance with an embodiment of the present invention.

During operation, the system measures the performance metrics for each HDD in the set of HDDs, wherein the performance metrics are sensitive to mechanical vibrations (step 302). Specifically, the system performs an I/O throughput test on each of the HDDs using a pre-selected throughput test method, and then collects the real-time I/O throughput data from the HDD for analysis. In one embodiment of the present invention, the system uses a telemetry harness associated with the computer system to collect time-series throughput data and send the data to a local or a remote location for analysis. In one embodiment, this telemetry harness is a Continuous System Telemetry Harness (CSTH).

The system then ranks the I/O throughput performance of the set of HDDs and identifies an HDD associated with the lowest I/O throughput (i.e., highest level of vibration-induced degradation) (step 304). Next, the system identifies the HDD associated with the lowest I/O throughput as the target HDD (step 306).

Referring back to FIG. 2, the system next determines if the lowest I/O throughput from the set of HDDs is above a threshold value associated with an acceptable performance (step 204)

If so, the system determines that all HDD I/O throughput performances are above threshold, and no mitigation action is needed.

Otherwise, if the lowest I/O throughput is below the threshold, the system identifies one or more primary vibration sources that affect the I/O throughput of the target HDD from the set of fans. Specifically, for each fan in the set of fans, the system performs a "fan sweep" test to determine if the fan is a primary vibration source for the target HDD (step 206). More specifically, this fan sweep test sweeps through an operational range of fan rotation speeds (RPM) while monitoring the I/O throughput performance of the target HDD. If a given fan is a vibration source, the system observes variations in the I/O throughput of the target HDD as the fan speed is swept through its operation range. Accordingly, the system identifies all the fans that affect the I/O throughput of the target HDD as primary vibration sources. Note that the system may identify one or more primary vibration sources from the set of fans. However, it is possible that none of the fans is identified as a primary vibration source.

Next, the system determines if at least one primary vibration source is identified from the set of fans (step 208). If so, for each identified primary vibration source and the target HDD, the system computes a CPSD between the source-target pair (step 210).

Process of Computing a CPSD between the Source and the Target

Figure 4:
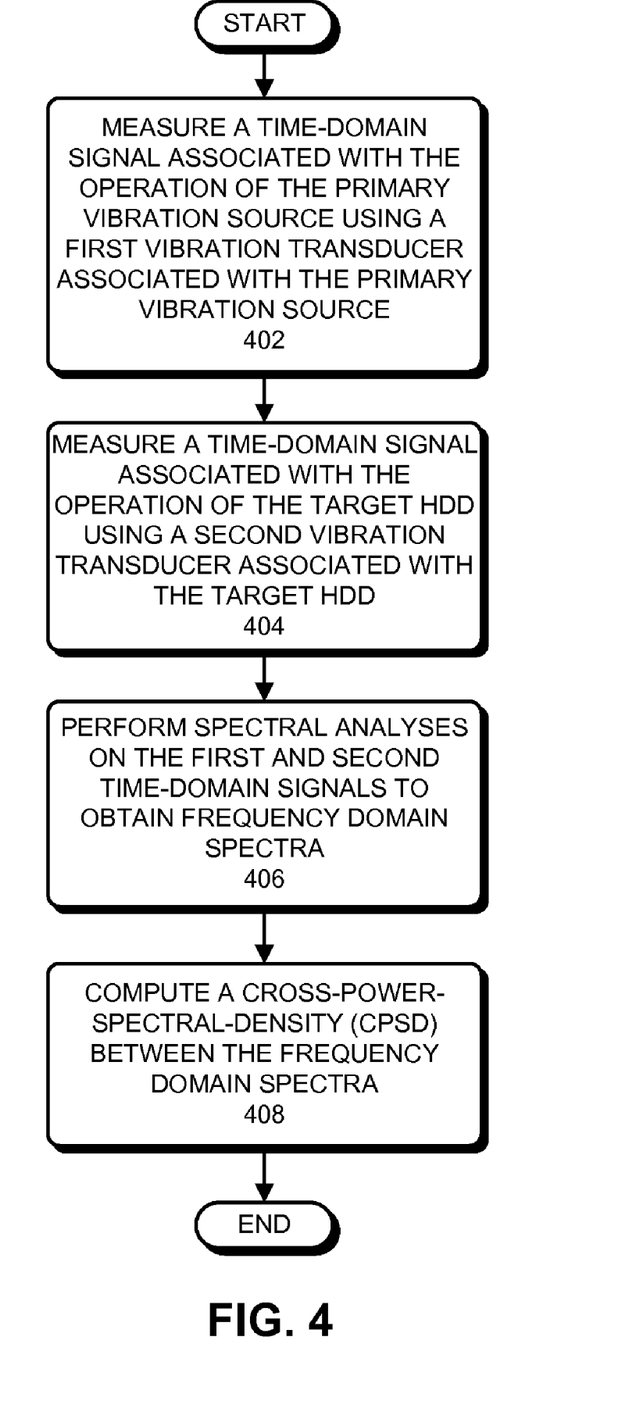
FIG. 4 presents a flowchart illustrating the process of computing a cross-power-spectral-density (CPSD) between a vibration source and a target HDD in accordance with an embodiment of the present invention.

FIG. 4 presents a flowchart illustrating the process of computing a CPSD between a vibration source and a target HDD in accordance with an embodiment of the present invention.

During operation, the system measures a first time-domain signal associated with the operation of the vibration source using a first vibration transducer (step 402). In one embodiment of the present invention, the first vibration transducer is an accelerometer attached to the vibration source (i.e., the fan). Note that the first vibration transducer can be manually placed on the vibration source being measured. Alternatively, the first vibration transducer can be an integrated vibration transducer on the vibration source.

The system also measures a second time-domain signal associated with the operation of the target HDD using a second vibration transducer (step 404). In one embodiment of the present invention, the second vibration transducer is an accelerometer attached to the target HDD. Note that the second vibration transducer can be manually placed on the target HDD. Alternatively, the second vibration transducer can be an integrated vibration transducer on the target HDD. For example, some HDDs include one or more accelerometers which are integrated inside the disk drives.

In one embodiment of the present invention, both the first and the second time-domain signals are measured during the same time period.

Next, the system performs a spectral analysis, such as a Fast Fourier Transform (FFT), on the first and the second time-domain signals respectively, to obtain the corresponding frequency domain spectra (step 406). Note that first frequency domain spectrum can contain frequency peaks associated with a primary fan speed and the associated harmonics, while the second frequency domain spectrum can contain frequency peaks associated with the main HDD rotation speed and the associated harmonics.

The system then computes a CPSD function between the corresponding frequency domain spectra (step 408). Specifically, this involves computing the cross-correlation between the corresponding power-spectral-density spectra. Note that CPSD is a bi-variate frequency-domain technique that provides a quantitative metric for measuring the strength of mechanical coupling between a vibration source component and a target HDD. The strength of this mechanical coupling is indicated by the amplitudes of the CPSD coupling coefficients. Moreover, the CPSD computation prominently identifies coherent, correlated vibrations that are common between the source and the target components, while suppressing random, incoherent vibrations between the source and target components.

EXAMPLES

Figure 5:
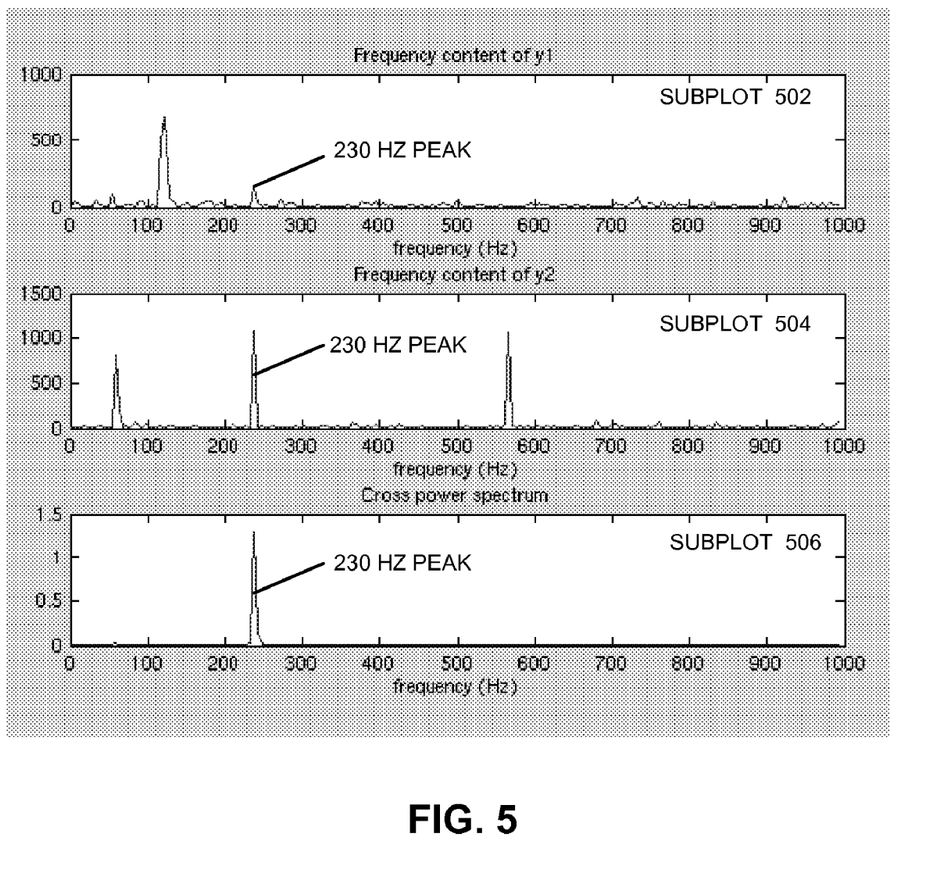
FIG. 5 illustrates exemplary CPSD plots for a source-target component pair in accordance with an embodiment of the present invention.

FIG. 5 illustrates exemplary CPSD plots for a source-target component pair in accordance with an embodiment of the present invention.

More specifically, FIG. 5 comprises: subplot 502 which illustrates a frequency domain signal from an HDD; subplot 504 which illustrates a frequency domain signal from a fan; and subplot 506 which illustrates the cross-power spectrum of the first two subplots. Note that both the signal from a disk drive and the signal from the fan have a common frequency component at about 230 Hz as shown in FIG. 5. Also note that the cross-spectrum plot 506 has a peak only at this frequency, which indicates the presence of this frequency component in both signals with great certainty. All other components, which are unique to either signal, do not show up in the cross-spectrum.

As illustrated in subplot 502, even though the amplitude of the common component is very small (near the noise level) in this signal, the cross-spectrum technique is sufficiently sensitive to detect it. Hence, subplot 506 demonstrates the precision and sensitivity of the CPSD technique in detecting the common vibrations that are mechanically coupled between the source and target components while ignoring independent vibrational components.

Figure 6:
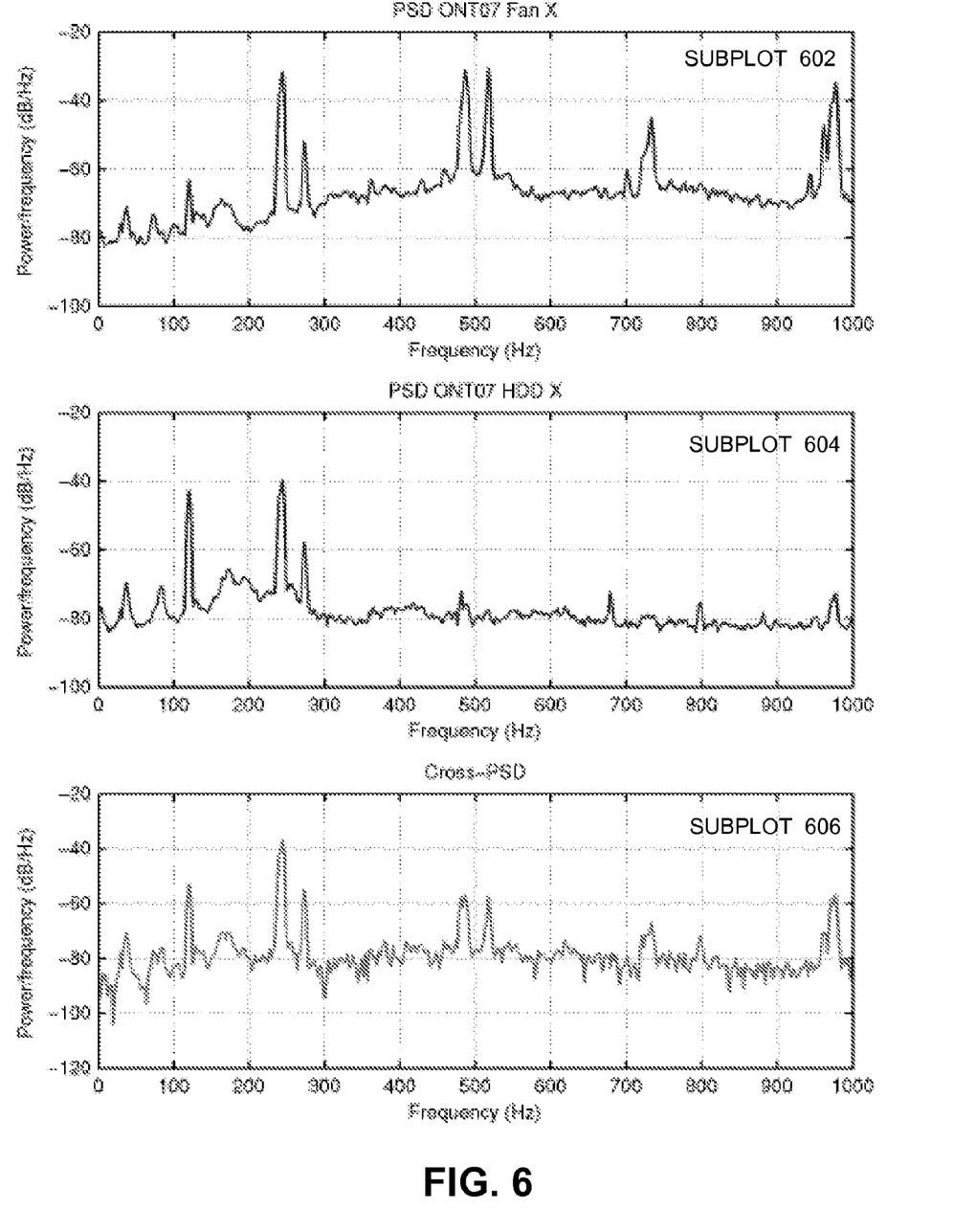
FIG. 6 illustrates CPSD plots obtained from a [source-fan, target HDD] pair in accordance with an embodiment of the present invention.

FIG. 6 illustrates CPSD plots obtained from a [source-fan, target HDD] pair in accordance with an embodiment of the present invention.

FIG. 6 comprises subplot 602 which illustrates a power spectral density associated with a fan in a server, subplot 604 which illustrates a power spectral density associated with an HDD in the server, and subplot 606 which illustrates the CPSD of the first two subplots. Note that the CPSD plot shows correlation peaks at the fan frequency around 240 Hz and also at the harmonics, which indicates strong mechanical coupling between the fan and the disk drive.

Referring back to FIG. 2, after the system has computed CPSDs between all [primary source, target] pairs in step 210, the system next selectively mitigates the primary vibration sources (step 212). Note that instead of mitigating all the identified primary vibration sources in step 206, which can be a large number of vibration sources, the system prioritizes the primary vibration sources as described below.

Selectively Mitigate Primary Vibration Sources

Figure 7:
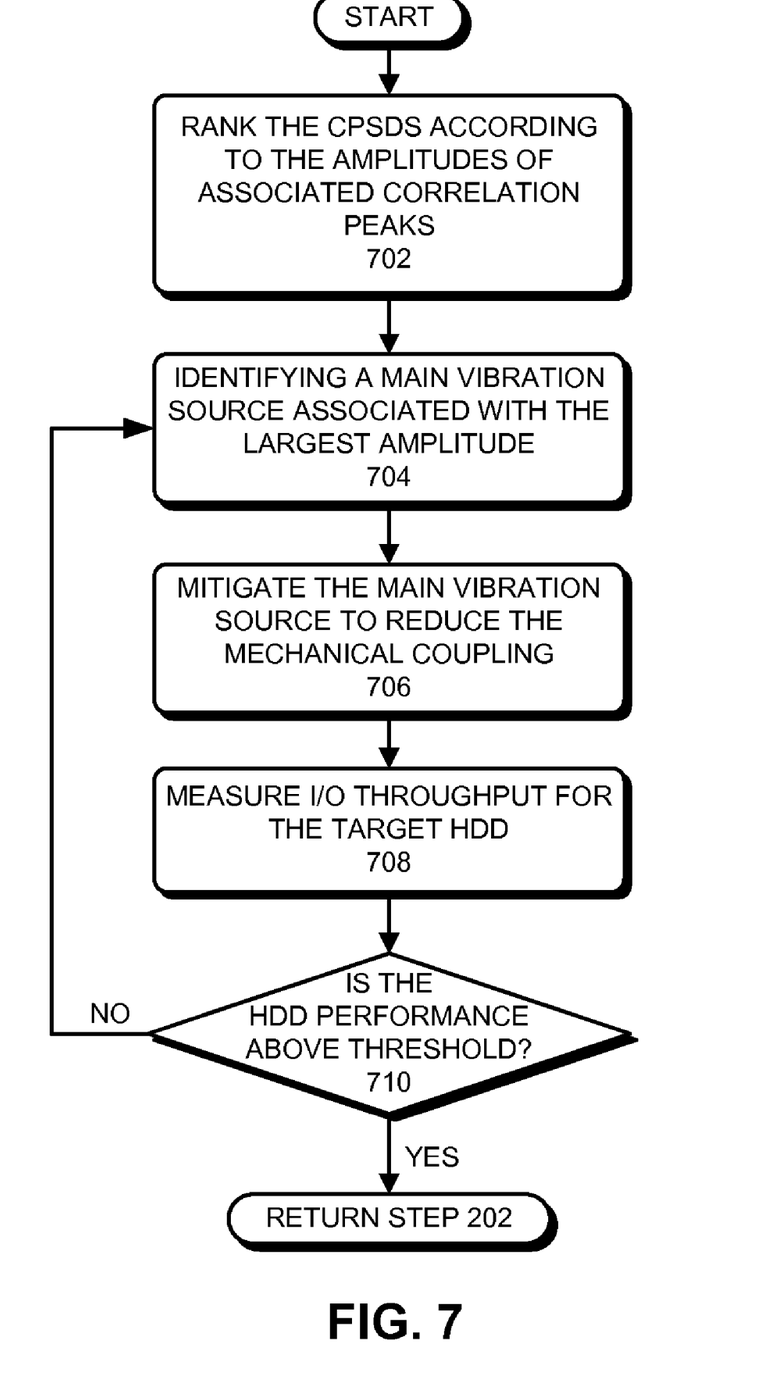
FIG. 7 presents a flowchart illustrating the process of selectively mitigating multiple primary vibration sources in accordance with an embodiment of the present invention.

FIG. 7 presents a flowchart illustrating the process of selectively mitigating multiple primary vibration sources in accordance with an embodiment of the present invention.

During operation, the system ranks the CPSDs computed in step 210 according to the amplitudes of associated correlation peaks (step 702). The system then identifies a main vibration source in the one or more primary vibration sources associated with the largest correlation amplitude (step 704).

Next, the system mitigates the identified vibration source to reduce mechanical coupling between the main vibration source and the target HDD (step 706). Specifically, this step involves mitigating the mechanical path between the main vibration source and the target HDD. For example, the system can apply damping and/or stiffening materials around the main vibration source. Note that this step mitigates the "worst" vibration source in the computer system. It is possible that by mitigating the worst vibration source, the overall vibrational health of the system has been sufficiently improved that no further mitigation is needed.

The system next measures the I/O throughput for target HDD (step 708) and subsequently determines if the performance metrics of the target HDD has improved above the threshold (step 710). If not, the system returns to step 704 to identify another main vibration source from the primary vibration sources associated with the next largest correlation peak in the CPSDs. The system subsequently repeats steps 706-710 to further improve the vibration health of the target HDD. The iteration process continues until the I/O throughput of the target HDD is above the threshold. When the I/O throughput of the target HDD is above the threshold, the system returns to step 202 in FIG. 2.

Referring back to FIG. 2, after the system has mitigated the vibration sources to improve the performance metrics of the current target HDD above the threshold, the system returns to step 202 and performs a new round of I/O throughput tests for the set of HDDs. If all HDDs are now above the performance threshold, the mitigation process is complete. However, if one or more HDDs are still below the performance threshold, the system proceeds to identify the new "worst" HDD as a new target HDD and repeats the above procedures illustrated in FIGS. 2-4 and 7. Note that it is likely that after a few iterations, the vibration problem is resolved. Moreover, because the mitigation process is performed on an "as-needed" basis by prioritizing the source fans, the number of fans that have to be mitigated is minimized.

Identify Primary Vibration Sources in the HDDs

Referring to FIG. 2, note that in step 208 the system may otherwise determine that no primary vibration source was identified from the set of fans during step 206. If so, the system continues to attempt to identify one or more primary vibration sources from the set of HDDs. Specifically, the system performs a rotational vibration (RV) test on the remaining of the HDDs while monitoring the performance of the target HDD in response to the RV test (step 214). Note that the system performs the RV tests starting with the HDDs in closest proximity to the target HDD, which are more likely to be mechanically coupled to the target HDD.

The system then determines if any of the adjacent HDDs cause performance variations in the target HDD (step 216). If so, the system identifies those HDDs as primary vibration sources and goes to step 210 to compute CPSDs between each source-target pair in the manner described above.

Otherwise, if no HDDs are affecting the target HDD, the system determines that the target HDD is most likely defective, which means that the performance degradation of the target HDD is not caused by fans, as is determined in step 208, or by other HDDs, as is determined in step 216 (step 218). At this point, the system can swap out the target HDD and can perform a root cause analysis (RCA) on the target HDD. The system then returns to step 202 to identify a new target HDD. Because the mitigation process is performed on an "as-needed" basis by prioritizing the source HDDs, the number of HDDs that have to be mitigated is also minimized.

Embodiments of the present invention involve manually placing accelerometer sensors on the components (HDDs and/or fans) for which CPSD coupling coefficients are desirable. However, by prioritizing both target HDDs and vibration sources as described above, the amount of manual effort involved can be reduced. The manual effort can be further reduced by integrating accelerometers into the components. Note that many high-end disk drives have one or two accelerometers inside. Fans typically do not have integrated accelerometers, but low-cost, high-precision accelerometers can be conveniently integrated into the fans in the future.

Note that although we describe the target device in the context of an HDD, the general technique of mitigating vibration problems is also applicable to other critical system components, including but not limited to, a CPU, a GPU, a power supply, or a memory component. Hence, the present invention is not limited to a pair consisting of a source fan and a target HDD.

CONCLUSION

Embodiments of the present invention provide a systematic analysis technique for mitigating vibration problems in a computer system equipped with multiple fans and multiple HDDs. This technique involves several levels of prioritization procedures, which reduces analysis effort and minimizes mitigation work. Embodiments of the present invention use real-time performance metrics to identify the affected target components and a bi-variate CPSD mechanical coupling coefficient assessment to selectively mitigate the vibration sources.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for mitigating the effects of multiple vibration sources on a set of hard disk drives (HDDs) within a computer system, the method comprising:
    identifying a target HDD in the set of HDDs, wherein performance of the target HDD is affected by mechanical vibrations;
    identifying one or more primary vibration sources that affect the performance of the target HDD from the multiple vibration sources;
    for each of the primary vibration sources,
        measuring a first time-domain signal associated with the operation of the primary vibration source using a first vibration transducer associated with the primary vibration source;
        measuring a second time-domain signal associated with the target HDD using a second vibration transducer associated with the target HDD, wherein measuring the first and second time-domain signals involves measuring the first and second time-domain signals during a same time period; and
        computing a cross-power-spectral-density (CPSD) between the first and the second time-domain signals; and
    selectively mitigating the primary vibration sources based on the CPSDs between the primary vibration sources and the target HDD.

2. The method of claim 1, wherein identifying the target HDD in the set of HDDs involves:
    performing I/O throughput measurements on the set of HDDs;
    ranking the I/O throughput performance of the set of HDDs;
    determining if the lowest I/O throughput is below a threshold; and
    if so, identifying an HDD associated with the lowest I/O throughput as the target HDD.

3. The method of claim 1, wherein the method further comprises classifying the multiple vibration sources into a set of fans and a set of HDDs.

4. The method of claim 3, wherein for each fan in the set of fans, identifying the one or more primary vibration sources involves:
    sweeping through an operational range of fan rotation speeds while monitoring the performance of the target HDD; and
    if the performance of the target HDD varies with the fan rotation speeds, determining that the associated fan is a primary vibration source.

5. The method of claim 3, wherein identifying one or more primary vibration sources from the set of HDDs involves:
    performing a rotational vibration (RV) test on an HDD adjacent to the target HDD while monitoring the performance of the target HDD; and
    if the performance of the target HDD varies with the RV test, determining that the associated HDD is a primary vibration source.

6. The method of claim 1, wherein prior to computing the CPSD between the first and the second time-domain signals, the method further comprises performing a spectral analysis on the first and the second time-domain signals to obtain the corresponding frequency domain spectra.

7. The method of claim 6, wherein computing the CPSD between the first and the second time-domain signals involves computing a cross-correlation between the corresponding frequency domain spectra.

8. The method of claim 1, wherein both the first and second vibration transducers are accelerometers.

9. The method of claim 1, wherein selectively mitigating the primary vibration sources based on the CPSDs between the primary vibration sources and the target HDD involves:
    ranking the CPSDs according to the amplitudes of associated correlation peaks;
    identifying a main vibration source associated with the largest amplitude; and mitigating the main vibration source to reduce a mechanical coupling between the main vibration source and the target HDD.

10. The method of claim 9, wherein mitigating the main vibration source involves applying damping and/or stiffening materials around the main vibration source.

11. The method of claim 9, further comprising:
determining if the performance of the target HDD has improved above a threshold;
if not, identifying a second main vibration source associated with the second largest amplitude; and
mitigating the second main vibration source to reduce a mechanical coupling between the second main vibration source and the target HDD.

12. The method of claim 1, wherein the spectral analysis is performed using a Fast Fourier Transform (FFT).

13. A computer readable storage medium storing instructions that when executed by a computer cause the computer to perform a method for mitigating the effects of multiple vibration sources on a set of hard disk drives (HDDs) within a computer system, the method comprising:
identifying a target HDD in the set of HDDs, wherein performance of the target HDD is affected by mechanical vibrations;
identifying one or more primary vibration sources that affect the performance of the target HDD from the multiple vibration sources;
for each of the primary vibration sources,
measuring a first time-domain signal associated with the operation of the primary vibration source using a first vibration transducer associated with the primary vibration source;
measuring a second time-domain signal associated with the target HDD using a second vibration transducer associated with the target HDD, wherein measuring the first and second time-domain signals involves measuring the first and second time-domain signals during a same time period; and
computing a cross-power-spectral-density (CPSD) between the first and the second time-domain signals; and
selectively mitigating the primary vibration sources based on the CPSDs between the primary vibration sources and the target HDD.

14. The computer readable storage medium of claim 13, wherein identifying the target HDD in the set of HDDs involves:
performing I/O throughput measurements on the set of HDDs;
ranking the I/O throughput performance of the set of HDDs;
determining if the lowest I/O throughput is below a threshold; and
if so, identifying an HDD associated with the lowest I/O throughput as the target HDD.

15. The computer readable storage medium of claim 13, wherein the method further comprises classifying the multiple vibration sources into a set of fans and a set of HDDs.

16. The computer readable storage medium of claim 15, wherein for each fan in the set of fans, identifying the one or more primary vibration sources involves:
sweeping through an operational range of fan rotation speeds while monitoring the performance of the target HDD; and
if the performance of the target HDD varies with the fan rotation speeds, determining that the associated fan is a primary vibration source.

17. The computer readable storage medium of claim 15, wherein identifying one or more primary vibration sources from the set of HDDs involves:
performing a rotational vibration (RV) test on an HDD adjacent to the target HDD while monitoring the performance of the target HDD; and
if the performance of the target HDD varies with the RV test, determining that the associated HDD is a primary vibration source.

18. The computer readable storage medium of claim 13, wherein prior to computing the CPSD between the first and the second time-domain signals, the method further comprises performing a spectral analysis on the first and the second time-domain signals to obtain the corresponding frequency domain spectra.

19. The computer readable storage medium of claim 18, wherein computing the CPSD between the first and the second time-domain signals involves computing a cross-correlation between the corresponding frequency domain spectra.

20. The computer readable storage medium of claim 13, wherein selectively mitigating the primary vibration sources based on the CPSDs between the primary vibration sources and the target HDD involves:
ranking the CPSDs according to the amplitudes of associated correlation peaks;
identifying a main vibration source associated with the largest amplitude; and
mitigating the main vibration source to reduce a mechanical coupling between the main vibration source and the target HDD.

21. The computer readable storage medium of claim 20, further comprising:
determining if the performance of the target HDD has improved above a threshold;
if not, identifying a second main vibration source associated with the second largest amplitude; and
mitigating the second main vibration source to reduce a mechanical coupling between the second main vibration source and the target HDD.

22. An apparatus that mitigates the effects of multiple vibration sources on a set of hard disk drives (HDDs) within a computer system, comprising:
an identification mechanism configured to identify a target HDD in the set of HDDs, wherein performance of the target HDD is affected by mechanical vibrations;
wherein the identification mechanism is configured to identify one or more primary vibration sources that affect the performance of the target HDD from the multiple vibration sources;
a measurement mechanism configured to measure a first time-domain signal associated with the operation of each of the primary vibration sources using a first vibration transducer associated with each of primary vibration sources;
wherein the measurement mechanism is configured to measure a second time-domain signal associated with the target HDD using a second vibration transducer associated with the target HDD, wherein when measuring the first and second time-domain signals, the measurement mechanism is configured to measure the first and second time-domain signals during a same time period;
a computing mechanism configured to compute a cross-power-spectral-density (CPSD) between each pair of the first and the second time-domain signals; and a mitigation mechanism configured to selectively mitigate the primary vibration sources based on the CPSDs between the primary vibration sources and the target HDD.

23. The apparatus of claim 22, wherein both the first and second vibration transducers are accelerometers.

* * * * *